(12) United States Patent
McEvoy et al.

(10) Patent No.: US 11,408,370 B2
(45) Date of Patent: Aug. 9, 2022

(54) VARIABLE AREA FAN NOZZLE FOR TURBOFAN AIRCRAFT ENGINE

(71) Applicant: SHORT BROTHERS PLC, Belfast (GB)

(72) Inventors: Finbarr McEvoy, Dromara (GB); Gary Davison, Carrickfergus (GB)

(73) Assignee: SHORT BROTHERS PLC, Belfast (GB)

( * ) Notice: Subject to any disclaimer, the term of this patent is extended or adjusted under 35 U.S.C. 154(b) by 0 days.

(21) Appl. No.: 16/772,480

(22) PCT Filed: Dec. 6, 2018

(86) PCT No.: PCT/GB2018/053545
§ 371 (c)(1),
(2) Date: Jun. 12, 2020

(87) PCT Pub. No.: WO2019/116008
PCT Pub. Date: Jun. 20, 2019

(65) Prior Publication Data
US 2020/0400096 A1    Dec. 24, 2020

(30) Foreign Application Priority Data

Dec. 15, 2017   (GB) ...................... 1720950

(51) Int. Cl.
*F02K 1/80* (2006.01)
*F02K 1/09* (2006.01)
*F02K 1/72* (2006.01)
(52) U.S. Cl.
CPC ................ *F02K 1/805* (2013.01); *F02K 1/09* (2013.01); *F02K 1/72* (2013.01);
(Continued)

(58) Field of Classification Search
CPC ..... F02K 1/06; F02K 1/09; F02K 1/40; F02K 1/42; F02K 1/566; F02K 1/605;
(Continued)

(56) References Cited

U.S. PATENT DOCUMENTS 3,779,010 A * 12/1973 Charnay .................... F02K 1/09
60/226.2
4,922,713 A *  5/1990 Barbarin ................... F02K 1/09
239/265.31
(Continued)

FOREIGN PATENT DOCUMENTS

GB            1386232 A *  3/1975  ............... F02K 1/72

OTHER PUBLICATIONS

International Search Report dated Jan. 21, 2019, for International Patent Application No. PCT/GB2018/053545.
(Continued)

*Primary Examiner* — Stephanie Sebasco Cheng
(74) *Attorney, Agent, or Firm* — Hovey Williams LLP (57) ABSTRACT

A variable area fan nozzle for a turbofan aircraft engine includes a first structure defining a forward portion of a bypass duct of the turbofan aircraft engine and a second structure defining an aft portion of the bypass duct. The second structure is movable relative to the first structure between a deployed position where a porting flow passage defined between the forward portion of the bypass duct and the aft portion of the bypass duct is open, and a stowed position where the porting flow passage is closed. The movable second structure comprises a vane and a slat attached to the vane and disposed forward of the vane. The porting flow passage extends between the slat and the vane when the second structure is in the deployed position.

15 Claims, 5 Drawing Sheets

(52) U.S. Cl.
CPC .... *F05D 2220/323* (2013.01); *F05D 2220/36* (2013.01); *F05D 2240/12* (2013.01)

(58) Field of Classification Search
CPC . F02K 1/625; F02K 1/72; F02K 1/805; F02K 1/54–766; F05D 2240/55–57; F05D 2240/59; F02C 7/28
See application file for complete search history.

(56) References Cited

U.S. PATENT DOCUMENTS

| | | | | |
|---|---|---|---|---|
| 5,778,659 | A * | 7/1998 | Duesler | F02K 1/09 239/265.27 |
| 8,505,307 | B2 | 8/2013 | Wang | |
| 9,103,298 | B2 * | 8/2015 | Gormley | F02K 3/06 |
| 10,151,270 | B2 * | 12/2018 | Todorovic | F02K 3/075 |
| 10,428,764 | B2 * | 10/2019 | Crawford | F02K 1/72 |
| 10,514,004 | B2 * | 12/2019 | Crawford | F01D 25/24 |
| 10,605,198 | B2 * | 3/2020 | Crawford | F02K 1/72 |
| 2013/0025259 | A1 * | 1/2013 | Beardsley | F02K 3/075 60/226.2 |
| 2014/0027537 | A1 * | 1/2014 | Binks | F02K 1/09 239/265.35 |
| 2014/0030057 | A1 * | 1/2014 | Gormley | F02K 1/09 415/1 |
| 2015/0308379 | A1 * | 10/2015 | James | F02K 1/763 60/226.2 |

OTHER PUBLICATIONS

International Written Opinion dated Jun. 20, 2019, for International Patent Application No. PCT/GB2018/053545.
United Kingdom Search Report dated Feb. 13, 2018, for United Kingdom Patent Application No. GB 1720950.3.

* cited by examiner

VARIABLE AREA FAN NOZZLE FOR TURBOFAN AIRCRAFT ENGINE

CROSS-REFERENCE TO RELATED APPLICATIONS

This is a National Stage Entry into the United States Patent and Trademark Office from International Patent Application No. PCT/GB2018/053545, filed on Dec. 6, 2018, which application claims priority from United Kingdom Patent Application No. GB 1720950.3, filed on Dec. 15, 2017, the entire contents of which both of which are incorporated by reference herein.

TECHNICAL FIELD

The disclosure relates generally to aircraft, and more particularly to a turbofan aircraft engine.

BACKGROUND

A turbofan aircraft engine typically includes an engine core, a nacelle that surrounds the engine core, and a fan that propels a flow of ambient air through the engine. The flow of ambient air is typically split into engine core airflow and bypass airflow through a bypass duct that surrounds the engine core and that is defined by the nacelle of the engine. The fan typically produces a majority of the thrust produced by the turbofan aircraft engine.

When operating a turbofan aircraft engine, it can be desirable to vary the area of the outlet of the bypass duct (i.e., fan nozzle exit area) during different flight conditions. Varying the fan nozzle's exit area can adjust an engine's bypass flow characteristics (e.g., fan pressure ratio) to better match a particular flight condition or thrust level.

SUMMARY

In one aspect, the disclosure describes a variable area fan nozzle for a turbofan aircraft engine. The variable area fan nozzle comprises:

a first structure defining a forward portion of a bypass duct of the turbofan aircraft engine; and a second structure defining an aft portion of the bypass duct disposed aft of the forward portion of the bypass duct, the second structure being movable relative to the first structure between a deployed position where a porting flow passage defined between the forward portion of the bypass duct and the aft portion of the bypass duct is open, and a stowed position where the porting flow passage is closed, the second structure comprising:

a vane; and a slat attached to the vane and disposed forward of the vane, the porting flow passage extending between the slat and the vane when the second structure is in the deployed position.

The slat may be received in a cavity inside the first structure when the second structure is in the stowed position.

The vane may comprise a forward aerodynamic surface and the slat may comprise an aft aerodynamic surface spaced apart from the forward aerodynamic surface of the vane. The forward aerodynamic surface of the vane and the aft aerodynamic surface of the slat may at least partially define the porting flow passage.

The forward aerodynamic surface of the vane and the aft aerodynamic surface of the slat may both be convex relative to the porting flow passage.

The slat may be attached to the vane via one or more brackets extending across the porting flow passage.

The slat may be sealed with the first structure when the second structure is in the deployed position. The vane may be sealed with the first structure when the second structure is in the stowed position.

The variable area fan nozzle may comprise a radially-outer sealing element configured and disposed to provide a radially-outer sealed interface between the first structure and the second structure.

The radially-outer sealing element may be attached to the first structure and may comprise:

a radially-outer vane sealing portion for interfacing with the vane when the second structure is in the stowed position; and a radially-outer slat sealing portion for interfacing with the slat when the second structure is in the deployed position.

The radially-outer sealing element may be sealingly engaged with a radially-outer skin of the vane when the second structure is in the stowed position.

The first sealing element may be a leaf-type seal.

The slat may comprise an aft aerodynamic surface spaced apart from the vane. The aft aerodynamic surface of the slat may at least partially define the porting flow passage. The slat may comprise a portion other than the aft aerodynamic surface of the slat for interfacing with a radially-outer sealing element attached to the first structure.

The portion other than the aft aerodynamic surface of the slat may be defined by a protrusion disposed on a side of the slat opposite the aft aerodynamic surface of the slat.

The variable area fan nozzle may comprise a radially-inner sealing element configured and disposed to provide a radially-inner sealed interface between the first structure and the second structure.

The radially-inner sealing element may be attached to the first structure and may comprise:

a radially-inner vane sealing portion for interfacing with the vane when the second structure is in the stowed position; and a radially-inner slat sealing portion for interfacing with the slat when the second structure is in the deployed position.

The radially-inner sealing element may be configured to provide a sealed interface between the forward and aft portions of the bypass duct when the second structure is in the stowed position.

The radially-inner sealing element may comprise a tongue extending from a main body. The radially-inner vane sealing portion and the radially-inner slat sealing portion may comprise different sides of the tongue.

The tongue may be configured and located to contact a surface of the slat facing the porting flow passage.

The main body of the radially-inner sealing element may be hollow.

The radially-inner sealing element may comprise a stiffener made from a material different from a material of the main body.

The vane of the second structure may at least partially define a non-porting flow exit. Movement of the second structure from the stowed position to the deployed position may cause an increase in an exit plane area of the non-porting flow exit.

The variable area fan nozzle may comprise:

a radially-outer sealing element configured and disposed to provide a radially-outer sealed interface between the first structure and the second structure; and a radially-inner sealing element configured and disposed to provide a radially-inner sealed interface between the first structure and the second structure.

Embodiments can include combinations of the above features.

In another aspect, the disclosure describes a nacelle for a turbofan aircraft engine, the nacelle comprising the variable area fan nozzle as described herein.

In another aspect, the disclosure describes an aircraft engine comprising the variable area fan nozzle as described herein.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The following disclosure relates to turbofan aircraft engines including variable area fan nozzles (VAFNs). In various embodiments, a VAFN as described herein includes a forward structure defining a forward portion of a bypass duct of the turbofan aircraft engine and a movable aft structure defining an aft portion of the bypass duct. The movable structure may be movable (e.g., translatable) relative to the forward structure between a deployed position where a porting flow passage defined between the forward portion of the bypass duct and the aft portion of the bypass duct is open, and a stowed position where the porting flow passage is closed. The porting flow passage may provide an additional channel for bypass air flowing in the bypass duct to be vented overboard. In some embodiments, the sealing between the forward structure and the movable structure may be provided by way of a radially-outer seal and a separate radially-inner seal.

Aspects of various embodiments are described through reference to the drawings.

Figure 1:
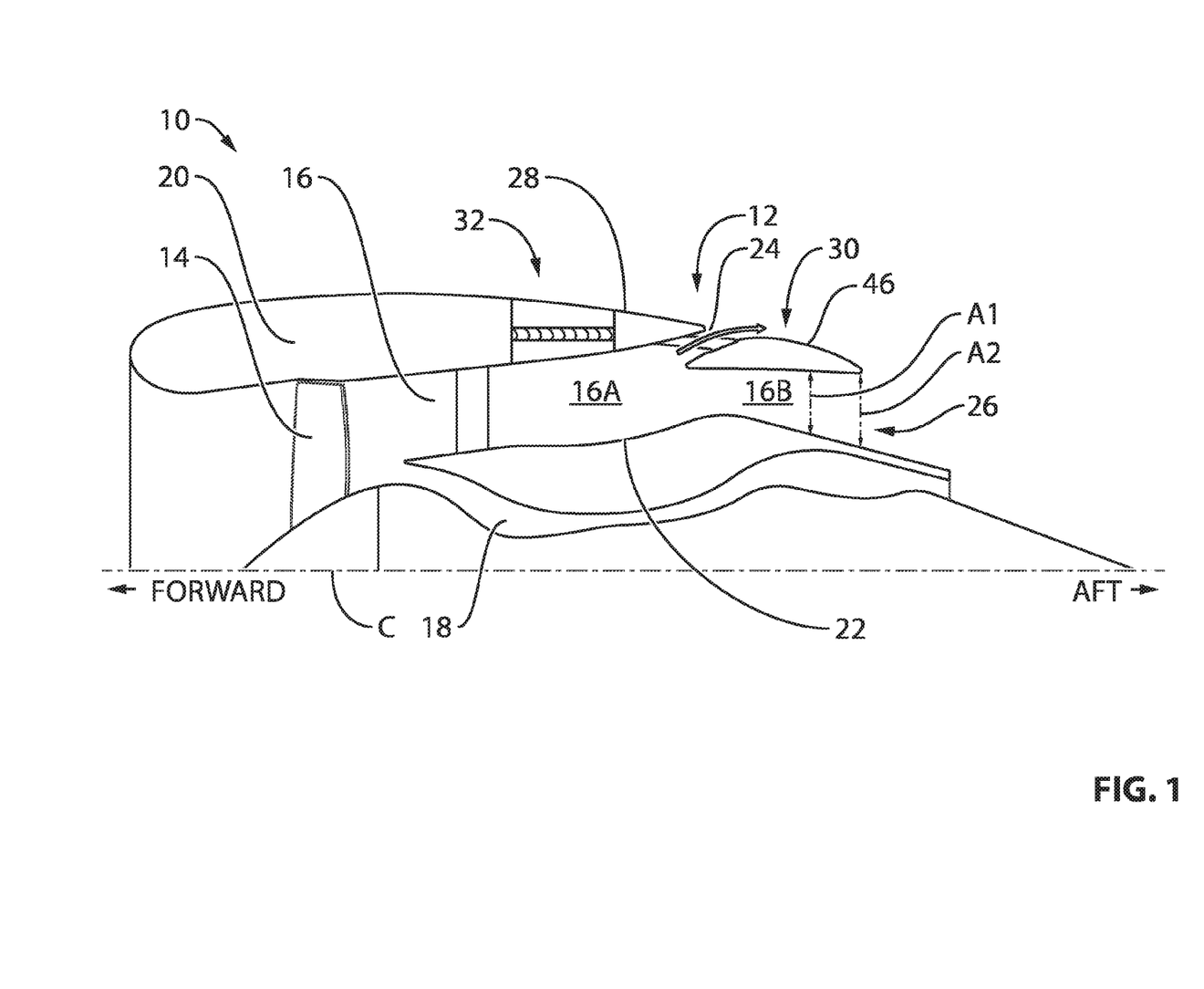
FIG. 1 shows an upper half of an axial cross-section view of a turbofan aircraft engine comprising an exemplary variable area fan nozzle (VAFN) as described herein.

FIG. 1 shows an upper half of an axial cross-section view of turbofan aircraft engine 10 comprising an exemplary variable area fan nozzle 12 (referred hereinafter as "VAFN 12"). Engine 10 may be of a type for use in aircraft applications. For example, engine 10 may comprise a turbofan type of engine for propelling a suitable aircraft such as corporate, private, commercial or a narrow-body, twin engine jet airliner for example. Engine 10 may comprise fan 14 through which ambient air is propelled, bypass duct 16 and core section 18. Core section 18 may comprise, in serial flow, a compressor section, a combustor and a turbine section. Bypass duct 16 may be defined by and extend between nacelle 20 and casing 22 of engine 10. Engine 10 may have a central axis C which may also correspond to an axis of rotation of fan 14. Bypass duct 16 may be generally circumferentially uniform about central axis C. For example, bypass duct 16 may extend at least partially around central axis C of engine 10. In various embodiments, engine 10 may have a relatively high bypass ratio.

VAFN 12 may serve to vary the size of the exit area available to the bypass airflow in bypass duct 16 during various flight/operating conditions of engine 10. In some flight/operating conditions, it might be desirable to have a larger exit area available for the bypass airflow to exit bypass duct 16 and in other flight/operating conditions, it might be desirable to have a smaller exit area available for the bypass airflow to exit bypass duct 16. VAFN 12 may be configured to vary the exit area by opening or closing porting flow passage 24 and also by varying the exit plane area of non-porting flow exit 26.

Engine 10 may have generally forward and aft directions as indicated in FIG. 1. The forward direction may be the typical direction of movement of engine 10 when used to propel an aircraft in flight. VAFN 12 may comprise forward structure 28 defining forward portion 16A of bypass duct 16 of engine 10 and movable structure 30 defining aft portion 16B of bypass duct 16 disposed aft of forward portion 16A of bypass duct 16. Movable structure 30 may be translatable generally along central axis C relative to forward structure 28 between a deployed position where porting flow passage 24 defined between forward portion 16A of bypass duct 16 and aft portion 16B of bypass duct 16 is open, and, a stowed position where porting flow passage 24 is closed. FIG. 1 shows movable structure 30 in the deployed position where porting flow passage 24 is open.

The translation of movable structure 30 may also cause a change in the exit plane area of non-porting flow exit 26. Dimensions A1 and A2 illustrated in FIG. can be indicative of the change in exit plane area of non-porting flow exit 26. Dimension A1 represents a shorter radial distance between a trailing edge of movable structure 30 and casing 22 when movable structure 30 is in the stowed position. On the other hand, dimension A2 represents a longer radial distance between the trailing edge of movable structure 30 and casing 22 when movable structure 30 is in the deployed position. The translation of movable structure 30 in the aft direction and generally along central axis C, in combination with the radially-inwardly sloping outer surface of casing 22 (i.e., relative geometry change) may cause the illustrated increase in exit plane area of non-porting exit 26. The use of porting flow passage 24 in addition to varying the exit plane area of non-porting flow exit 26 may promote shorter translation of movable structure 30 being required compared to relying only on the increase in exit plane area of non-porting exit 26 to achieve a desired increase in exit area. The shorter travel distance may hence facilitate the use of a shorter and lighter actuation system. In some installations, engine 10 may comprise a suitable thrust reverser 32, of which forward structure 28 of nacelle 20 may be part.

Porting flow passage 24 may provide a porting (e.g., bypass, alternate) flow exit where bypass airflow inside of bypass duct 16 may be discharged from bypass duct 16. Movable structure 30 may be movable between a stowed (i.e., forward) position where porting flow passage 24 is closed and a deployed (i.e., aft) position where porting flow passage 24 is fully open. It is understood that, in some embodiments, VAFN 12 may be configured so that movable structure 30 may be moved to and held at an intermediate position between the fully stowed position and the fully deployed position to achieve a different intermediate size of porting flow passage 24 and also achieve a different intermediate size of the exit plane area of non-porting exit 26. It is understood that any suitable actuation mechanism (see FIG. 3) may be used to actuate movable structure 30 between the stowed and deployed positions relative to forward structure 28.

Figure 2A:
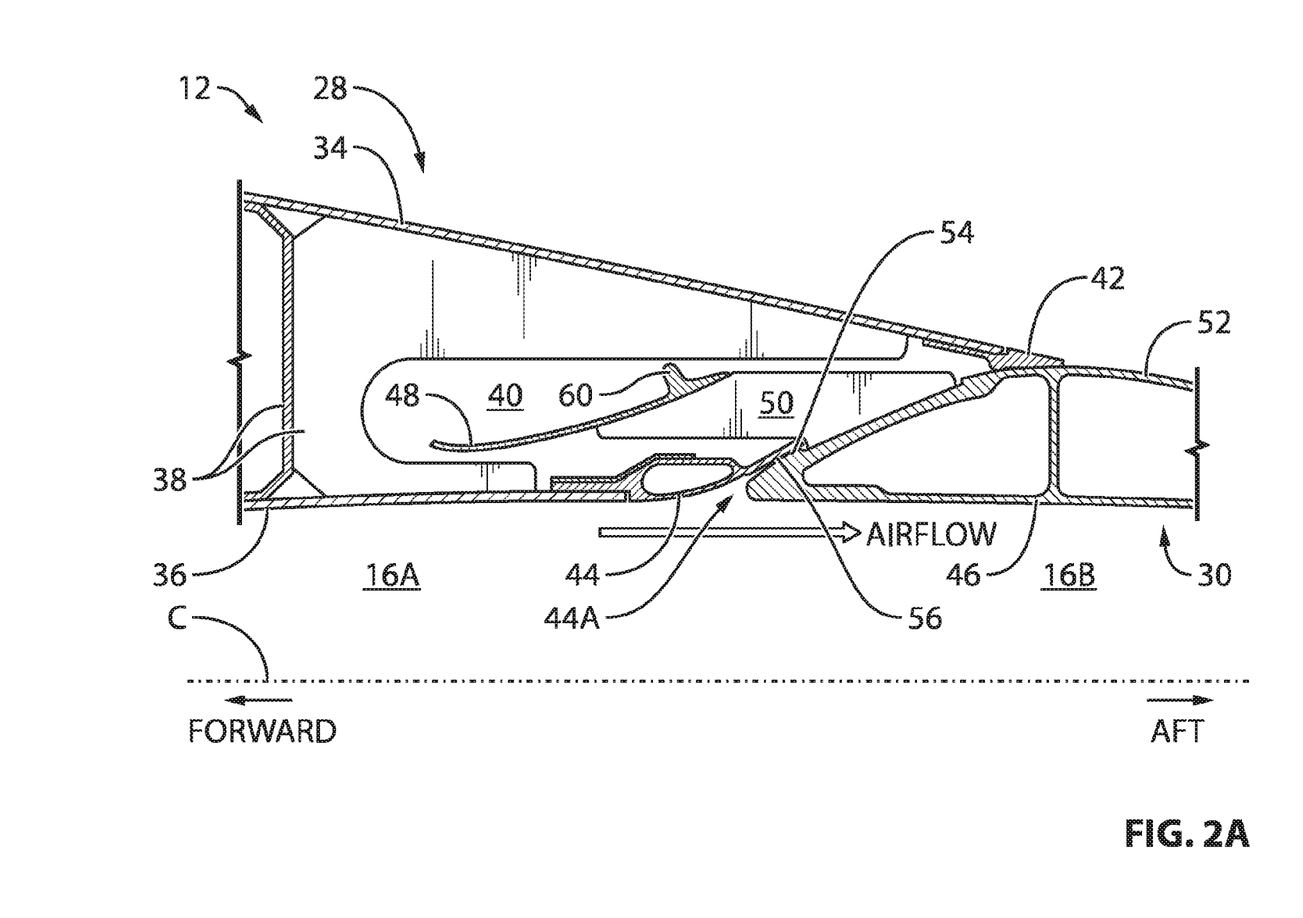
FIG. 2A is an axial cross-section view of the VAFN of the engine of FIG. 1 in the stowed position.

FIG. 2A is an enlarged axial cross-section view of VAFN 12 of engine 10 showing movable structure 30 in the stowed position where porting flow passage 24 is closed. In some embodiments, forward structure 28 may comprise or be part of a translatable cowl (transcowl) that is part of thrust reverser 32. Even though forward structure 28 is referenced herein as being fixed or stationary in the context of the operation of VAFN 12, it is understood that forward structure 28 (e.g., transcowl) could also be movable in another context such as in the operation of thrust reverser 32.

Stowing/retraction of movable structure 30 may include translation of movable structure 30 generally in the forward direction relative to forward structure 28. Forward structure 28 of nacelle 20 may include outer skin 34 for interfacing with a flow of ambient air outside of engine 10, and inner skin 36 defining part of forward portion 16A of bypass duct 16 for interfacing with bypass airflow. Forward structure 28 may comprise structural members 38 (e.g., braces, ribs) supporting outer skin 34 and inner skin 36. Forward structure 28 may define cavity 40 into which a portion of movable structure 30 is received when movable structure 30 is in the stowed position. Forward structure 28 may comprise radially-outer sealing element 42 configured and disposed to provide a radially-outer sealed interface between forward structure 28 and movable structure 30. Forward structure 28 may also comprise radially-inner sealing element 44 configured and disposed to provide a radially-inner sealed interface between forward structure 28 and movable structure 30.

Movable structure 30 may comprise vane 46 and slat 48. Slat 48 may be attached to vane 46 and disposed forward of vane 46. Slat 48 may be attached to vane 46 via one or more brackets 50 extending between vane 46 and slat 48. In the configuration shown in FIG. 2A, slat 48 and bracket(s) 50 can be received inside cavity 40 of forward structure 28 when movable structure 30 is in the stowed position where porting passage 24 (see FIG. 1) is closed.

Radially-outer sealing element 42 may be configured and disposed to provide a radially-outer sealed interface between forward structure 28 and movable structure 30 in both the stowed and deployed positions of movable structure 30. In some embodiments, radially-outer sealing element 42 may be fixedly secured to forward structure 28 by suitable means and may sealingly engage with a radially-outer skin 52 of vane 46 when movable structure 30 is in the stowed position. In other words, radially-outer sealing element 42 may provide a substantially sealed interface between outer skin 34 of forward structure 28 and outer skin 52 of vane 46 when movable structure 30 is in the stowed position. Radially-outer sealing element 42 may comprise vane sealing portion 42A (see FIG. 4) for interfacing with vane 46 when movable structure 30 is in the stowed position.

Radially-inner sealing element 44 may be configured and disposed to provide a radially-inner sealed interface between forward structure 28 and movable structure 30 in both the stowed and deployed positions of movable structure 30. In some embodiments, radially-inner sealing element 44 may be fixedly secured to forward structure 28 by suitable means and may sealingly engage with a forward-facing skin 54 of vane 46 facing forward structure 28, when movable structure 30 is in the stowed position. In other words, radially-inner sealing element 44 may provide a substantially sealed interface between inner skin 36 of forward structure 28 and vane 46 when movable structure 30 is in the stowed position. For example, radially-inner sealing element 44 may provide a substantially sealed interface between forward portion 16A and aft portion 16B of bypass duct 16 when movable structure 30 is in the stowed position. Radially-inner sealing element 44 may comprise vane sealing portion 44A (see FIG. 5) for interfacing with vane 46 when movable structure 30 is in the stowed position. In some embodiments, vane sealing portion 44A of radially-inner sealing element 44 may comprise a first side of tongue 56 that is facing vane 46.

Figure 2B:
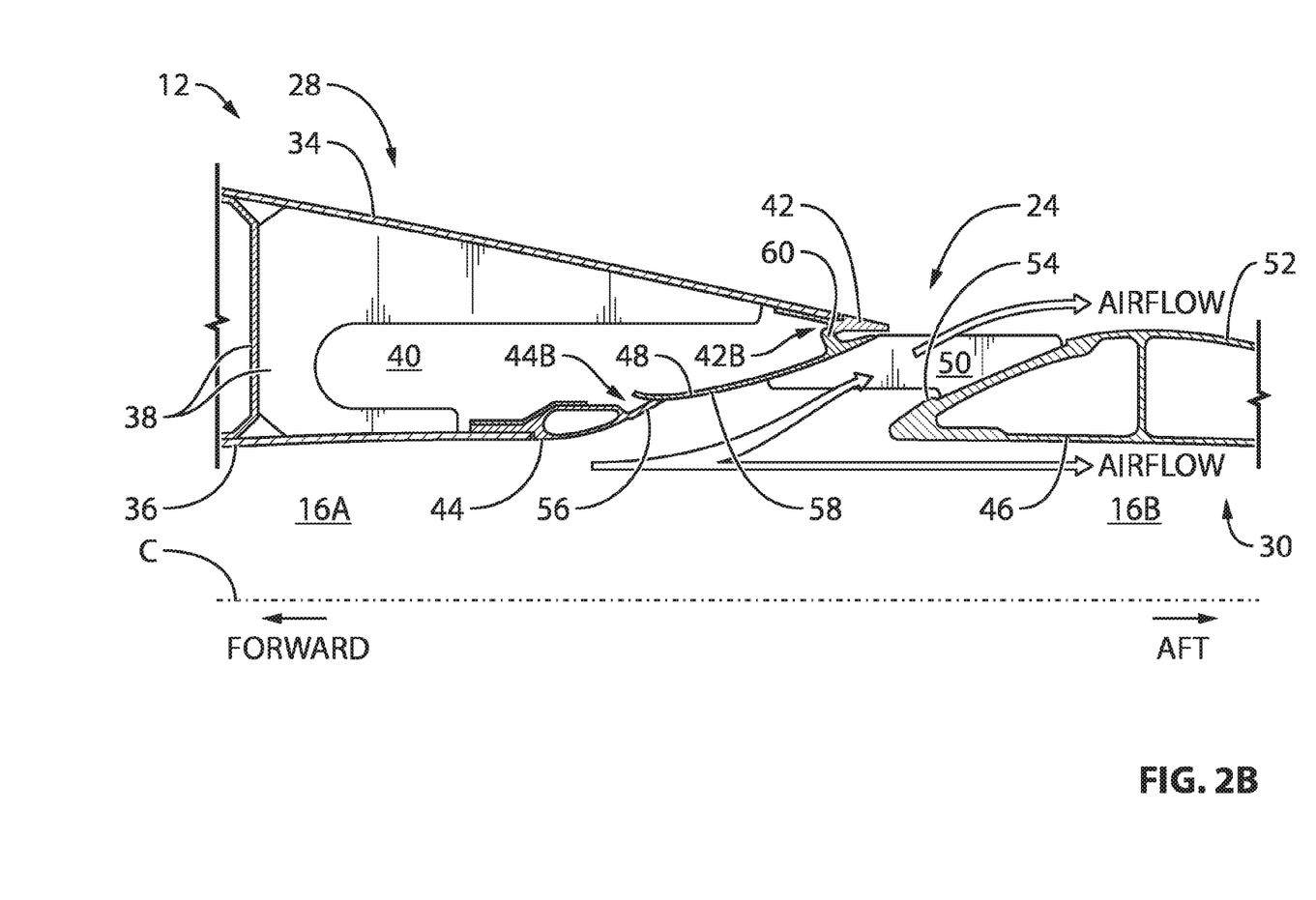
FIG. 2B is an axial cross-section view of the VAFN of the engine of FIG. 1 in the deployed position.

FIG. 2B is an enlarged axial cross-section view of VAFN 12 of engine 10 showing movable structure 30 in the deployed position where porting flow passage 24 is open. Porting flow passage 24 may be disposed axially between forward portion 16A and aft portion 16B of bypass duct 16. Deployment of movable structure 30 may include translation of movable structure 30 generally in the aft direction relative to forward structure 28. In this configuration, bypass airflow in bypass duct 16 can exit bypass duct 16 via both porting flow passage 24 and non-porting flow exit 26 (see FIG. 1) so that the overall exit cross-sectional area out of bypass duct 16 available to the bypass airflow is increased when movable structure 30 is in the deployed position compared to when movable structure 30 is in the stowed position.

The aft movement of movable structure 30 during deployment may cause vane 46 to become unsealed from sealing elements 42 and 44 so that porting flow passage 24 between forward structure 28 and vane 46 may then be formed. The deployment of movable structure 30 may also cause bracket(s) 50 and slat 48 to at least partially retract from cavity 40 until slat 48 becomes in sealing engagement with sealing elements 42 and 44. FIG. 2B shows movable structure 30 in the fully deployed position where porting flow passage 24 is fully open. Porting flow passage 24 may extend through a space between slat 48 and vane 46 of movable structure 30. For example, forward-facing skin 54 of vane 46 may comprise an aerodynamic surface defining at least a portion of an aft side of porting flow passage 24. Similarly, slat 48 may comprise aft-facing side 58 comprising an aerodynamic surface defining at least a portion of a forward side of porting flow passage 24. Forward-facing skin 54 and aft-facing side 58 of slat 48 may be spaced apart from each other and at least partially define porting flow passage 24 therebetween. In some embodiments, the aerodynamic surface defined by aft-facing side 58 of slat 48 may be convex relative to porting flow passage 24 so as to be curved or rounded toward/into porting flow passage 24. In some embodiments, the aerodynamic surface defined by forward-facing skin 54 of vane 46 may similarly be convex relative to porting flow passage 24 so as to be curved or rounded toward/into porting flow passage 24.

Radially-outer sealing element 42 may be configured and disposed to provide a radially-outer sealed interface between outer skin 34 of forward structure 28 and slat 48 of movable structure 30 when movable structure 30 is in the deployed position. Radially-outer sealing element 42 may comprise slat sealing portion 42B for interfacing with slat 48 when movable structure 30 is in the deployed position. Slat sealing portion 42B of radially-outer sealing element 42 may be configured to sealingly engage a portion of movable structure 30 other than the aerodynamic surface defined by aft-facing side 58 of slat 48. For example, in some embodiments, slat sealing portion 42B may be configured to sealingly engage a protrusion 60 (e.g., ridge) disposed on a forward side of slat 48 opposite aft-facing side 58 of slat 48.

Figure 3:
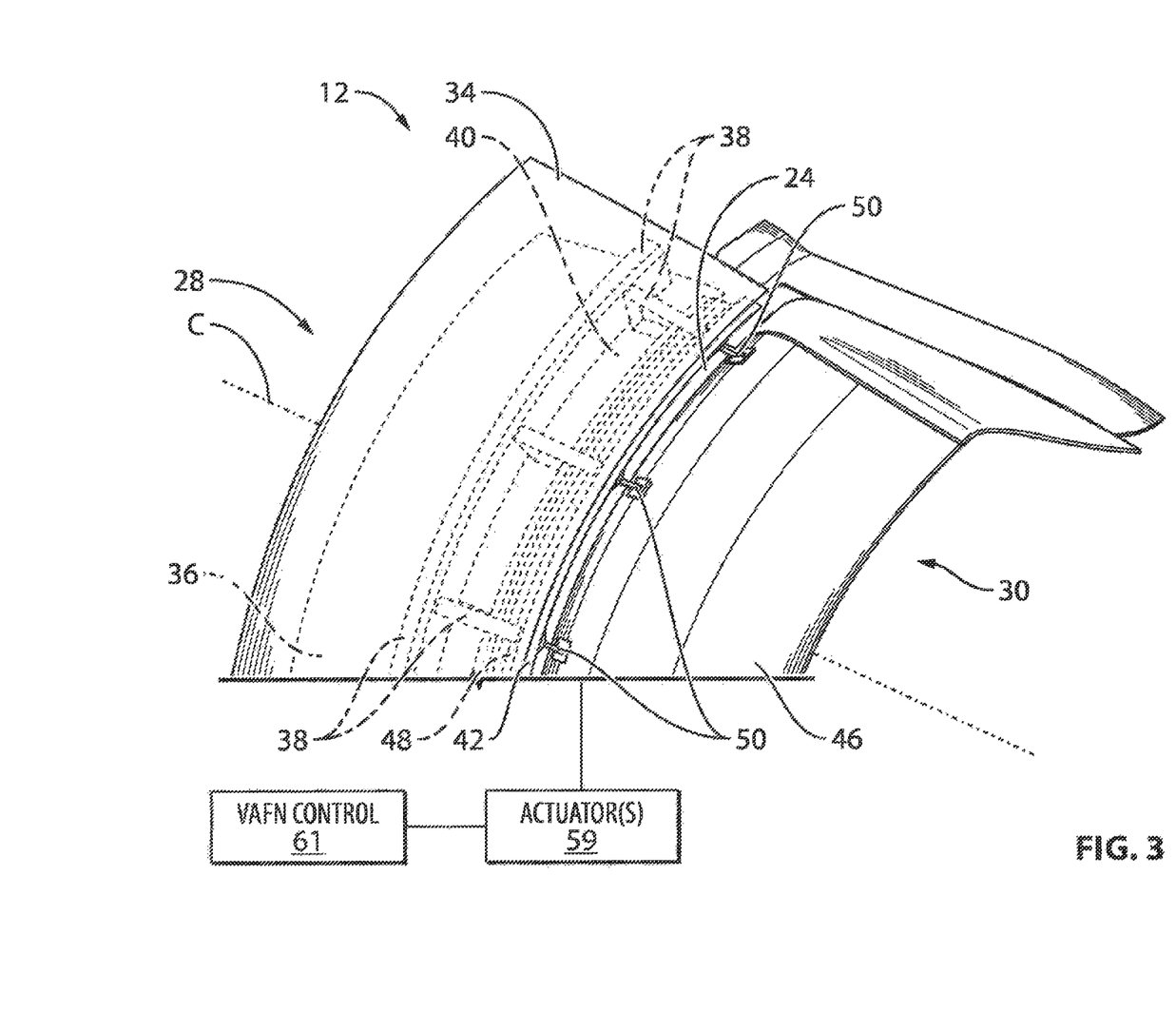
FIG. 3 is a perspective view of part of the VAFN in the deployed position.

Radially-inner sealing element 44 may be configured and disposed to provide a radially-inner sealed interface between inner skin 36 of forward structure 28 and slat 48 of movable structure 30 when movable structure 30 is in the deployed position. Radially-inner sealing element 44 may comprise slat sealing portion 44B for interfacing with slat 48 when movable structure 30 is in the deployed position. Radially-inner sealing element 44 may provide a substantially sealed interface between inner skin 36 of forward structure 28 and slat 48 when movable structure 30 is in the deployed position. In some embodiments, vane sealing portion 44A (see FIG. 2A) of radially-inner sealing element 44 may comprise a second side of tongue 56 opposite to porting flow passage 24. In some embodiments, tongue 56 may be resiliently biased away from porting flow passage 24 so that the engagement of slat 48 with tongue 56 of radially-inner sealing element 44 during deployment of movable structure 30 may cause resilient deflection of tongue 56 and thereby cause urging of tongue 56 toward slat 48 and enhance the performance of the sealing interface between tongue 56 and slat 48 in some situations, FIG. 3 is a perspective view of part of VAFN 12 with movable structure 30 in the deployed position where porting flow passage 24 is open and slat 48 is sealingly engaged with radially-outer sealing element 42 and radially-inner sealing element 44 (not shown in FIG. 3). It is understood that VAFN 12 may extend circumferentially at least partially around central axis C. In some embodiments, the circumferential span of VAFN 12 around central axis C may be substantially the same as that of thrust reverser 32 (see FIG. 1). In some embodiments, the circumferential span of VAFN 12 around central axis C may be interrupted at a top location (e.g., around twelve o'clock) corresponding to a location of a pylon coupling engine 10 to an underside of an aircraft wing for example. In some embodiments, VAFN 12 may comprise one or more discontinuous circumferential sections of VAFN 12 extending about central axis C. Accordingly, one or more porting flow passages 24 may be circumferentially disposed about central axis C. Porting flow passage(s) 24 may each define at least part of an annulus about central axis C.

As explained above, slat 48 may be fixedly attached to vane 46 via one or more brackets 50 extending across the space defining porting flow passage 24 between slat 48 and vane 46. Brackets 50 may be circumferentially spaced apart (distributed) about central axis C to provide the required structural support between slat 48 and vane 46. In some embodiments, brackets 50 may have a generally streamlined shape to reduce resistance to the flow of bypass air being discharged via porting flow passage 24. It is understood that components of VAFN 12 may be constructed using materials (e.g., fiber-reinforced composites, aluminum-based alloys) and manufacturing processes typically used in the production of nacelles and components thereof. FIG. 3 also schematically shows an exemplary actuation system including one more actuators 59 configured to cause movement (e.g., translation) of movable structure 30 and a suitable VAFN control system 61.

Figure 4:
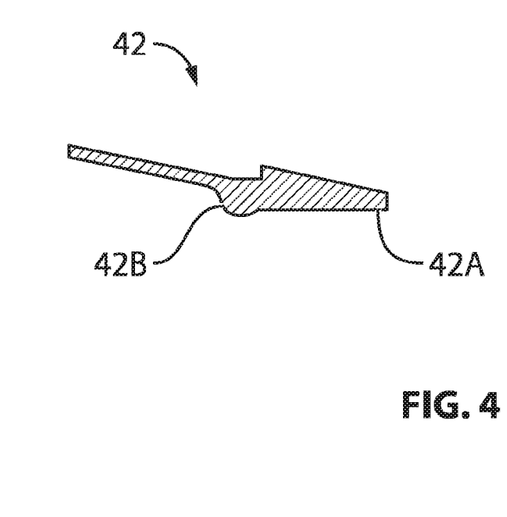
FIG. 4 is an axial cross-section view of a radially-outer sealing element of the VAFN.

FIG. 4 is an axial cross-section view of a radially-outer sealing element 42 of VAFN 12. Radially-outer sealing element 42 may extend circumferentially about central axis C and may have the same or similar circumferential span as slat 48 and as vane 46. In some embodiments, radially-outer sealing element 42 may be a leaf-type seal. In some embodiments, radially-outer sealing element 42 may be resiliently compressible and may be made from a suitable elastomeric material (e.g., silicon rubber). FIG. 4 shows vane sealing portion 42A of radially-outer sealing element 42 for interfacing with (e.g., contacting) vane 46, and slat sealing portion 42B of radially-outer sealing element 42 for interfacing with (e.g., contacting) slat 48. In some embodiments, vane sealing portion 42A and slat sealing portion 42B may be configured to be resiliently deformed (e.g., compressed) by the counterpart vane 46 and slat 48. However, it is understood that radially-outer sealing element 42 may be configured so that radially-outer sealing element 42 is not permanently deformed from normal interfacing with vane 46 and slat 48.

Alternatively, it is understood that radially-outer sealing element 42 could be configured to be disposed in close enough proximity to the counterpart vane 46 and slat 48 to provide some (e.g., partial) sealing function without necessarily being resiliently deformed by or being in contact with vane 46 and/or slat 48 at the respective stowed and deployed positions of movable structure 30.

Figure 5:
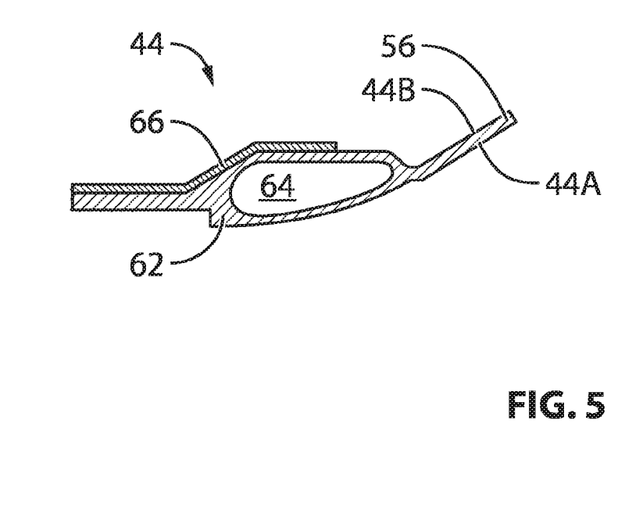
FIG. 5 is an axial cross-section view of a radially-inner sealing element of the VAFN.

FIG. 5 is an axial cross-section view of radially-inner sealing element 44 of VAFN 12. Radially-inner sealing element 44 may extend circumferentially about central axis C and may have the same or similar circumferential span as slat 48 and as vane 46. In some embodiments, radially-inner sealing element 44 may be resiliently compressible and may be made from a suitable elastomeric material (e.g., silicon rubber). FIG. 5 shows vane sealing portion 44A of radially-inner sealing element 44 for interfacing with (e.g., contacting) vane 46, and slat sealing portion 44B of radially-inner sealing element 44 for interfacing with (e.g., contacting) slat 48. In some embodiments, vane sealing portion 44A and slat sealing portion 44B may be configured to be resiliently deformed by the counterpart vane 46 and slat 48. However, it is understood that radially-inner sealing element 44 may be configured so that radially-inner sealing element 44 is not permanently deformed from normal interfacing with vane 46 and slat 48.

Alternatively, it is understood that radially-inner sealing element 44 could be configured to be disposed in close enough proximity to the counterpart vane 46 and slat 48 to provide some substantial sealing capability without necessarily being resiliently deformed or being in contact with vane 46 and/or slat 48 at the respective stowed and deployed positions of movable structure 30.

As explained above, radially-inner sealing element 44 may comprise tongue 56 extending from main body 62. Vane sealing portion 44A and slat sealing portion 44S may comprise different (e.g., opposite) sides of tongue 56. Vane sealing portion 44A may be configured and located to contact a surface (e.g., forward-facing skin 54) of vane 46 facing porting flow passage 24. Slat sealing portion 44S may be configured and located to contact a surface (e.g., aft-facing side 58) of slat 48 facing porting flow passage 24.

In some embodiments, tongue 56 may be resiliently deflected in the aft direction when slat 48 is in the deployed position and engaged with tongue 56. Such resilient deflection can cause tongue 56 to be resiliently urged against aft-facing side 58 of slat 48 so that the seal provided by the contact interface between tongue 56 and slat 48 may withstand more negative pressure differential caused by relatively nigh-velocity airflow in porting flow passage 24.

In light of the present disclosure, it is understood that the shape, material and configuration of radially-inner sealing element 44 and of radially-outer sealing element 42 may be different than the exemplary embodiments shown herein to provide the desired stiffness and sealing performance. For example, in some embodiments, main body 62 of radially-inner sealing element 44 may be hollow and comprise one or more hollow cavities 64. In some embodiments a single cavity 64 in main body 62 may provide more stability in the stiffness of radially-inner sealing element 44 at different temperatures due to the lack of ribs or other structural elements of radially-inner sealing element 44 that could become stiffer at lower temperatures and affect the overall stiffness of radially-inner sealing element 44. In some embodiments radially-inner sealing element 44 may comprise one or more stiffeners 66 made from a material different from a material of main body 62 to achieve the desired behavior/properties of radially sealing element 44. In some embodiments, stiffener 66 may be made from a metallic material.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A variable area fan nozzle for a turbofan aircraft engine, the variable area fan nozzle centered about a central axis of the turbofan engine and comprising:
   a first structure defining a forward portion of a bypass duct of the turbofan aircraft engine;
   a second structure defining an aft portion of the bypass duct disposed aft of the forward portion of the bypass duct, the second structure being movable relative to the first structure between a deployed position where a porting flow passage defined between the forward portion of the bypass duct and the aft portion of the bypass duct is open, and a stowed position where the porting flow passage is closed, the second structure comprising:
      a circumferentially extending vane including a forward aerodynamic surface;
      a circumferentially extending slat disposed forward of the vane, the slat including an aft aerodynamic surface spaced apart from the forward aerodynamic surface of the vane, the porting flow passage extending between the aft aerodynamic surface of the slat and the forward aerodynamic surface of the vane when the second structure is in the deployed position; and
      a plurality of brackets extending across the porting flow passage and attaching the slat to the vane, a portion of the aft aerodynamic surface extending forward from the brackets; and
   a radially-inner sealing element comprising:
      a main body attached to the first structure; and
      a tongue extending axially aft and radially outward from the main body relative to the central axis and configured to provide a radially-inner sealed interface between the first structure and the second structure over the circumferential extent of the slat and the circumferential extent of the vane, the tongue including:
         a radially-inner vane sealing side surface axially aft and radially outward of the main body, the radially-inner vane sealing side surface configured to interface with the vane so that the vane is sealed with the first structure when the second structure is in the stowed position; and
         a radially-inner slat sealing side surface that is opposite the radially-inner vane sealing side surface and axially aft and radially outward of the main body, the radially-inner slat sealing side surface configured to interface with the slat so that the slat is sealed with the first structure via the portion of the aft aerodynamic surface extending forward from the brackets when the second structure is in the deployed position.

2. The variable area fan nozzle as defined in claim 1, wherein the slat is received in a cavity inside the first structure when the second structure is in the stowed position.

3. The variable area fan nozzle as defined in claim 1, wherein the forward aerodynamic surface of the vane and the aft aerodynamic surface of the slat are both convex relative to the porting flow passage.

4. The variable area fan nozzle as defined in claim 1, further comprising a radially-outer sealing element configured and disposed to provide a radially-outer sealed interface between the first structure and the second structure.

5. The variable area fan nozzle as defined in claim 4, wherein the radially-outer sealing element is attached to the first structure and comprises: a radially-outer vane sealing portion configured to interface with the vane when the second structure is in the stowed position; and a radially-outer slat sealing portion configured to interface with the slat when the second structure is in the deployed position.

6. The variable area fan nozzle as defined in claim 5, wherein the radially-outer sealing element is sealingly engaged with a radially-outer skin of the vane when the second structure is in the stowed position.

7. The variable area fan nozzle as defined in claim 4, wherein the radially-outer sealing element is a leaf-type seal.

8. The variable area fan nozzle as defined in claim 1, further comprising a radially-outer sealing element attached to the first structure, wherein the slat further includes a portion other than the aft aerodynamic surface of the slat configured to interface with the radially-outer sealing element.

9. The variable area fan nozzle as defined in claim 8, wherein the portion other than the aft aerodynamic surface of the slat is defined by a protrusion disposed on a side of the slat opposite the aft aerodynamic surface of the slat.

10. The variable area fan nozzle as defined in claim 1, wherein the main body of the radially-inner sealing element is hollow.

11. The variable area fan nozzle as defined in claim 1, wherein the radially-inner sealing element comprises a stiffener made from a material different from a material of the main body.

12. The variable area fan nozzle as defined in claim 1, wherein: the vane of the second structure at least partially defines a non-porting flow exit; and movement of the second structure from the stowed position to the deployed position causes an increase in an exit plane area of the non-porting flow exit.

13. A nacelle for a turbofan aircraft engine centered about a central axis of the turbofan engine, the nacelle comprising:
   a variable area fan nozzle including:
      a first structure defining a forward portion of a bypass duct of the turbofan aircraft engine; and a second structure defining an aft portion of the bypass duct disposed aft of the forward portion of the bypass duct, the second structure being movable relative to the first structure between a deployed position where a porting flow passage defined between the forward portion of the bypass duct and the aft portion of the bypass duct is open, and a stowed position where the porting flow passage is closed, the second structure comprising:
  a circumferentially extending vane including a forward aerodynamic surface;
  a circumferentially extending slat disposed forward of the vane, the slat including an aft aerodynamic surface spaced apart from the forward aerodynamic surface of the vane, the porting flow passage extending between the aft aerodynamic surface of the slat and the forward aerodynamic surface of the vane when the second structure is in the deployed position;
  a plurality of brackets extending across the porting flow passage and attaching the slat to the vane, a portion of the aft aerodynamic surface extending forward from the brackets; and
a radially-inner sealing element comprising:
  a main body attached to the first structure; and
  a tongue extending axially aft and radially outward from the main body relative to the central axis and configured to provide a radially-inner sealed interface between the first structure and the second structure over the circumferential extent of the slat and the circumferential extent of the vane, the tongue including:
    a radially-inner vane sealing side surface axially aft and radially outward of the main body, the radially-inner vane sealing side surface configured to interface with the vane so that the vane is sealed with the first structure when the second structure is in the stowed position; and
    a radially-inner slat sealing side surface that is opposite the radially-inner vane sealing side surface and axially aft and radially outward of the main body, the radially-inner slat sealing side surface configured to interface with the slat so that the slat is sealed with the first structure via the portion of the aft aerodynamic surface extending forward from the brackets when the second structure is in the deployed position.

14. The nacelle as defined in claim 13, wherein the main body of the radially-inner sealing element is hollow.

15. The nacelle as defined in claim 13, wherein the radially-inner sealing element comprises a stiffener made from a material different from a material of the main body.

* * * * *